United States Patent
Peng et al.

(10) Patent No.: US 11,710,506 B1
(45) Date of Patent: Jul. 25, 2023

(54) HEAT-ASSISTED MAGNETIC RECORDING HEAD WITH A NEAR-FIELD TRANSDUCER HAVING A MULTILAYER NEAR-FIELD EMITTER

(71) Applicant: Seagate Technology LLC, Fremont, CA (US)

(72) Inventors: Chubing Peng, Eden Prairie, MN (US); Tae-Woo Lee, Eden Prairie, MN (US); Li Wan, Prior Lake, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/656,674

(22) Filed: Mar. 28, 2022

(51) Int. Cl.
*G11B 13/08* (2006.01)
*G11B 5/00* (2006.01)

(52) U.S. Cl.
CPC ...... *G11B 13/08* (2013.01); *G11B 2005/0021* (2013.01)

(58) Field of Classification Search
None
See application file for complete search history.

(56) References Cited

U.S. PATENT DOCUMENTS

| | | |
|---|---|---|
| 8,045,422 B2 | 10/2011 | Komura et al. |
| 8,130,599 B2 | 3/2012 | Komura et al. |
| 8,169,731 B2 | 5/2012 | Mizuno et al. |
| 8,208,349 B2 | 6/2012 | Tanaka et al. |
| 8,243,559 B2 | 8/2012 | Komura et al. |
| 8,325,567 B2 | 12/2012 | Miyauchi et al. |
| 8,369,192 B1 | 2/2013 | Komura et al. |
| 8,437,230 B2 | 5/2013 | Aoki et al. |
| 8,619,516 B1 | 12/2013 | Matsumoto |
| 8,934,198 B2 | 1/2015 | Zou et al. |
| 8,958,668 B2 | 2/2015 | Peng et al. |
| 8,964,514 B2 | 2/2015 | Hirata et al. |
| 9,153,267 B1 | 10/2015 | Komura et al. |
| 9,251,837 B2 | 2/2016 | Zhu et al. |
| 9,336,800 B2 | 5/2016 | Wessel et al. |
| 9,349,415 B1 * | 5/2016 | Mader ............... G11B 5/012 |
| 9,390,738 B1 * | 7/2016 | Mendonsa .......... G11B 5/6088 |
| 9,449,626 B2 | 9/2016 | Lee et al. |
| 9,620,151 B1 * | 4/2017 | Shimazawa ........... G11B 5/314 |
| 9,626,991 B2 | 4/2017 | Chen et al. |
| 9,728,209 B2 | 8/2017 | Chen et al. |
| 9,934,800 B1 * | 4/2018 | Neira ................ G11B 5/6088 |
| 10,043,542 B2 | 8/2018 | Shimazawa et al. |
| 10,062,401 B1 | 8/2018 | Zhao et al. |
| 10,121,496 B1 * | 11/2018 | Peng ................. G11B 5/4866 |
| 10,229,704 B2 | 3/2019 | Blaber et al. |
| 10,311,906 B2 | 6/2019 | Blaber et al. |
| 10,388,307 B1 * | 8/2019 | Bance ................ G11B 5/6088 |
| 10,490,214 B1 | 11/2019 | Chen |
| 10,490,221 B1 | 11/2019 | Chen |
| 10,586,560 B1 | 3/2020 | Wang et al. |

(Continued)

FOREIGN PATENT DOCUMENTS

WO 2016191707 A1 12/2016

*Primary Examiner* — Peter Vincent Agustin (57) ABSTRACT

A heat-assisted magnetic recording head includes a near-field transducer including a plasmonic disk and a multilayer near-field emitter. The multilayer near-field emitter is configured to produce a hot spot on a proximal magnetic disk. The multilayer near-field emitter is disposed in a down-track direction relative to and coupled to the plasmonic disk.

19 Claims, 6 Drawing Sheets

(56) References Cited

U.S. PATENT DOCUMENTS

| | | |
|---|---|---|
| 10,636,440 B2 | 4/2020 | Cheng et al. |
| 10,699,732 B2 | 6/2020 | Cheng et al. |
| 10,770,098 B1 | 9/2020 | Peng |
| 10,811,038 B1 | 10/2020 | Peng et al. |
| 11,043,240 B1 | 6/2021 | Shimazawa et al. |
| 11,056,135 B1 | 7/2021 | Peng |
| 2011/0205661 A1* | 8/2011 | Komura ................ B82Y 20/00 360/59 |
| 2012/0275280 A1* | 11/2012 | Miyauchi .............. G11B 5/3116 |
| 2014/0293761 A1* | 10/2014 | Jin ....................... G11B 5/4866 369/13.29 |
| 2015/0325261 A1* | 11/2015 | Yang .................. G11B 7/24062 369/13.33 |
| 2016/0351209 A1* | 12/2016 | Chen .................... G11B 5/3116 |
| 2017/0323659 A1* | 11/2017 | Matsumoto ........... G11B 5/3116 |

\* cited by examiner

HEAT-ASSISTED MAGNETIC RECORDING HEAD WITH A NEAR-FIELD TRANSDUCER HAVING A MULTILAYER NEAR-FIELD EMITTER

TECHNICAL FIELD

The disclosure relates to a near-field transducer for a heat-assisted magnetic recording head of a hard disk drive.

BACKGROUND

Some hard disk drives (HDDs) utilize heat-assisted magnetic recording (HAMR) to increase the areal density of the HDD. A recording head of a HAMR HDD typically includes a laser, a near-field transducer (NFT) configured to briefly heat a small hot spot on a surface of a magnetic disk of the HDD, and a write pole configured to write data to the magnetic disk in the vicinity of the hot spot. The process of generating and condensing localized surface plasmons (LSPs) on the NFT to produce the hot spot generates enormous amounts of heat which may degrade and/or deform various components of the NFT, thus potentially reducing the performance and/or life expectancy of the HAMR head and the HDD.

SUMMARY

The present disclosure describes a heat-assisted magnetic recording (HAMR) head having near-field transducer (NFT) that includes a multilayer near-field emitter. In some examples, the multilayer near-field emitter includes two or more layers that include different materials with different optical extinction coefficients. Including a metal with a higher extinction coefficient in one layer (e.g., an electric field barrier layer) may repel electric fields from the layer and reduce electric field penetration into the NFT. Repelling electric fields may reduce heating in the NFT, potentially improving reliability and extending the lifetime of the HAMR head. Additionally, providing a layer with a metal having a high extinction coefficient near an emitting region of the multilayer near-field emitter may provide better confinement of an emitted near-field, potentially increasing the thermal gradient of the emitted near-field and reducing the size of written bits of data on a magnetic disk. This may provide the HAMR head with higher areal density capability (ADC).

In one example, a HAMR head includes an NFT including a plasmonic disk and a multilayer near-field emitter configured to produce a hot spot on a proximal magnetic disk, wherein the multilayer near-field emitter is disposed in a down-track direction relative to and coupled to the plasmonic disk.

These and other features and aspects of various examples may be understood in view of the following detailed discussion and accompanying drawings.

DETAILED DESCRIPTION

Figure 1:
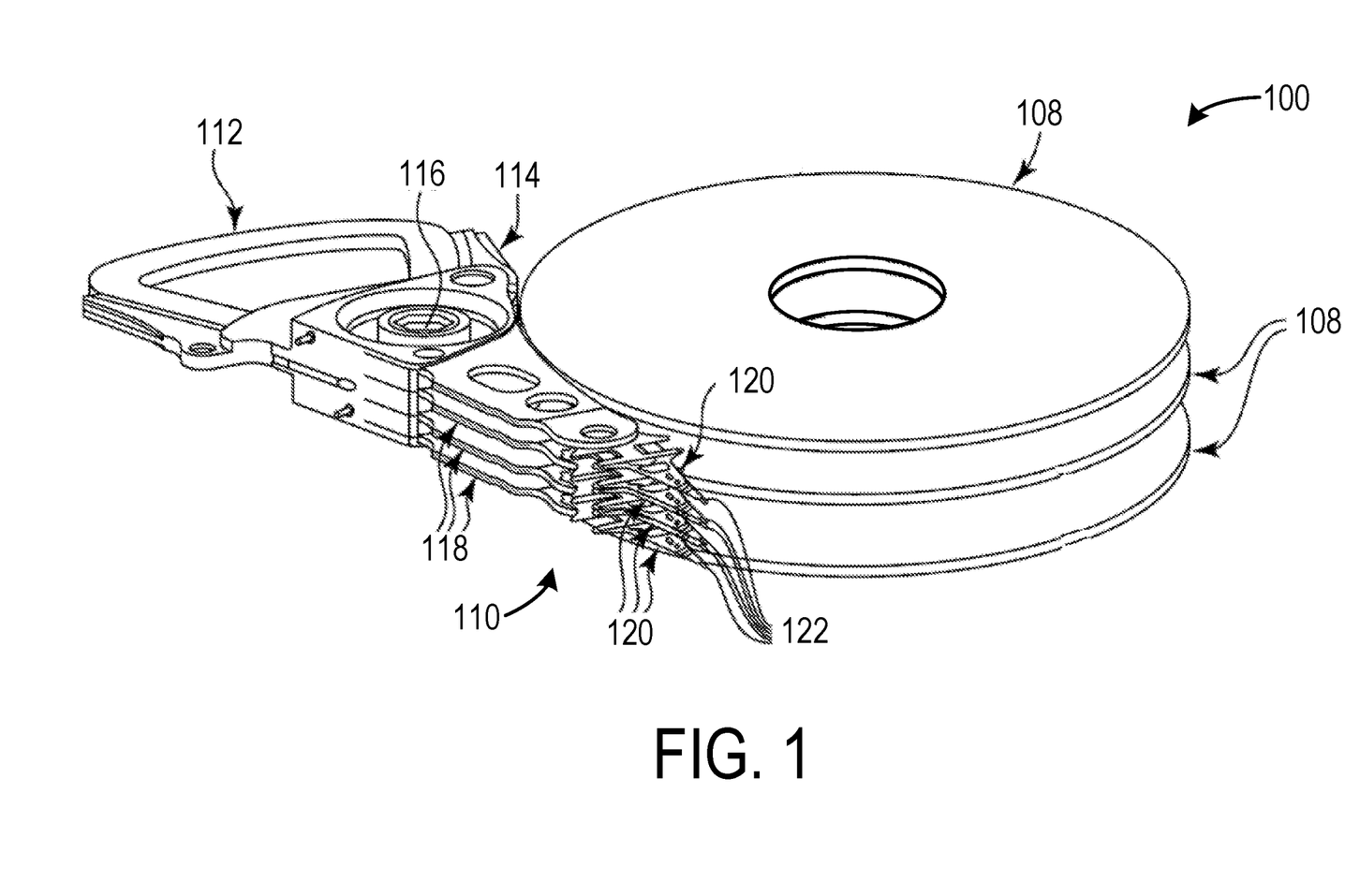
FIG. 1 is a perspective view of an example hard disk drive, in accordance with aspects of this disclosure.

FIG. 1 is a perspective view of an example heat assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 122. HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 122, to move relative to magnetic disks 108.

Figure 2:
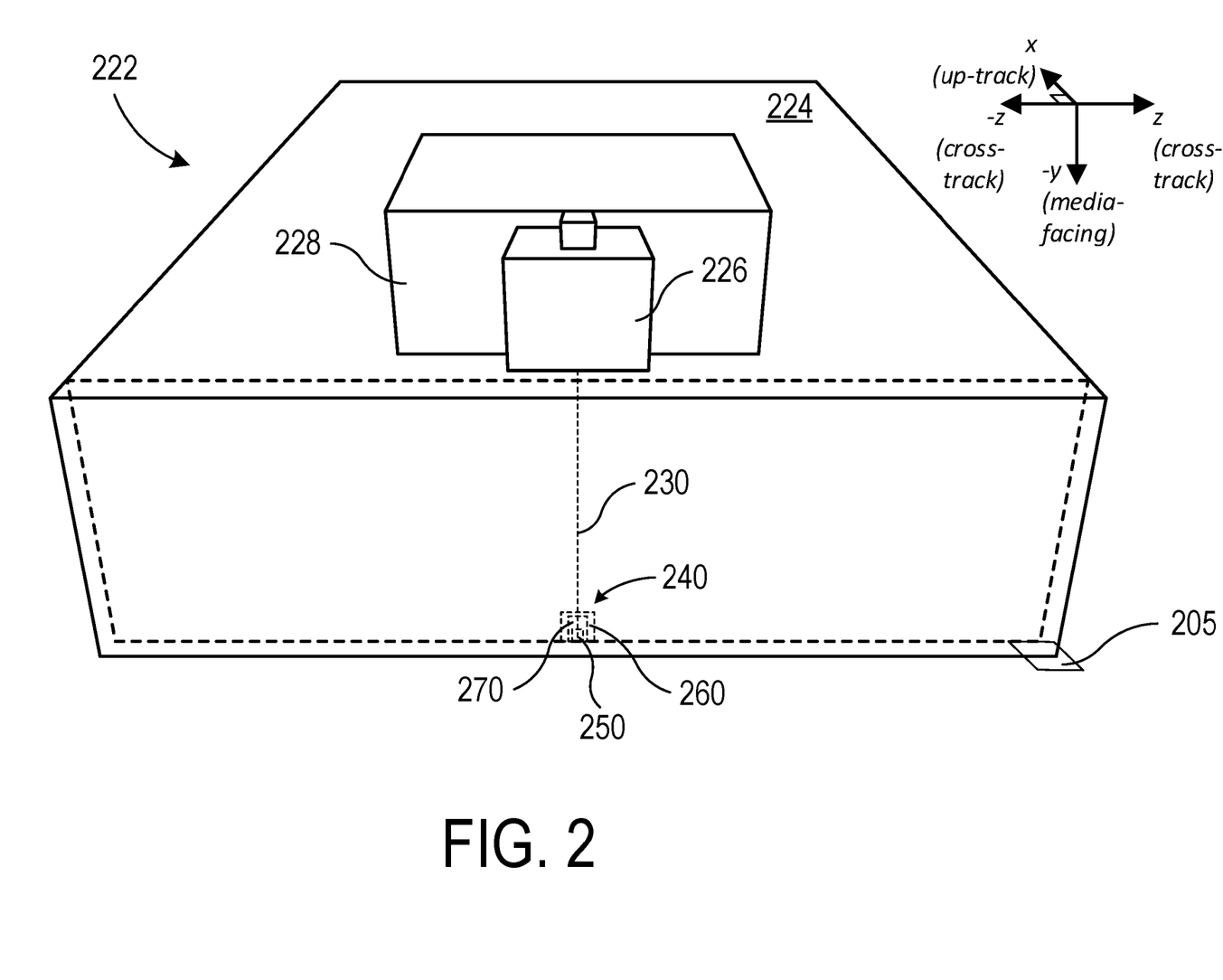
FIG. 2 is a perspective view of an example slider, in accordance with aspects of this disclosure.

FIG. 2 is a perspective view of an example slider 222, in accordance with aspects of this disclosure. Slider 222 is an example of slider 122 of FIG. 1. In the example of FIG. 2, slider 222 includes a slider body 224, a laser 226, a submount 228, and a HAMR head 240.

HAMR head 240 is configured to read data from and write data to a surface of a magnetic disk. HAMR head 240 includes a waveguide 230, a near-field transducer (NFT) 250, a writer 260, and a reader 270. In the example of FIG. 2, some features or parts of features of NFT 250, writer 260, and reader 270 are presented on a media-facing surface 205 that is positioned over a surface of a magnetic disk (e.g., a magnetic disk 108 of FIG. 1) during some operations of the HDD (e.g., write operations, read operations). In some examples, media-facing surface 205 is an air-bearing surface (ABS) that is configured to maintain magnetic recording head 240 at a target spacing (e.g., a head-media spacing) from a surface of the magnetic disk during some operations of HDD 100. During such operations, media-facing surface 205 faces and is held proximate to the moving surface of the magnetic disk by a cushion of gas, known as an active air bearing (AAB), that is produced from a dynamic flow of gas across a pattern of recessed sub-surfaces bound within the volume of slider body 224 by media-facing surface 205.

In some examples, laser 226 emits photons having a wavelength in the near infrared range (e.g., approximately 830 nm) or visible range. Examples of laser 226 include an optically pumped semiconductor laser, a quantum well laser, an integrated laser, or other suitable laser. Laser 226 of this example may be configured as an edge emitting laser (EEL), vertical cavity surface emitting laser (VCSEL), or other type of laser. Other example HAMR heads may include other types of light sources such as light emitting diodes (LEDs) and surface emitting diodes.

In one example, laser 226 is coupled to slider body 224 via submount 228. In the example of FIG. 2, laser 226 and submount 228 are located on a face of slider body 224 which is opposite to media-facing surface 205. In some examples, laser 226 may be directly mounted to the slider body 224. In some examples, laser 226 may be integrated into slider body 224 (e.g., through a transfer-printing process during fabrication of slider 222). Submount 228 may be configured to redirect photons output from laser 226 so that the photons are directed into waveguide 230 in the negative y-direction of FIG. 2 (e.g., toward NFT 250). The path between laser 226 and waveguide 230 may include one or more optical couplers, mode converters, and/or mode couplers. Waveguide 230 is formed integrally within slider body 224 and is configured to deliver photons from laser 226 to NFT 250. While FIG. 2 illustrates laser 226 coupled to slider body 224 via submount 228, in some examples, laser 226 may be directly mounted to slider body 224.

NFT 250 is configured to create a small hot spot on a magnetic disk. For example, NFT may generate and support a distribution of localized surface plasmons (LSPs) upon receiving incident photons from laser 226 by way of waveguide 230 and may condense the LSP distribution on an area or feature of NFT 250. NFT 250 amplifies a near-field of the condensed LSP distribution and focuses the near-field toward a surface of a magnetic disk (e.g., a magnetic disk 108 of FIG. 1) to produce a hot spot. Writer 260 is configured to generate a magnetic field from an electrical current and direct the magnetic field at the hot spot on the magnetic disk. The near-field energy heats and lowers the coercivity of the magnetic grains in the hot spot, thereby enabling these magnetic grains to be oriented by the magnetic field generated by writer 260. Turning off laser 226 or moving NFT 250 toward a different location of the magnetic disk (or moving the magnetic disk such that NFT 250 faces a different location of the magnetic disk) removes the focused near-field energy from the hot spot. Removing the near-field energy allows the magnetic grains contained in the spot to cool. The cooling locks in the grain orientation induced by the magnetic field generated by writer 260, thus preserving the bits of written data.

Figure 3:
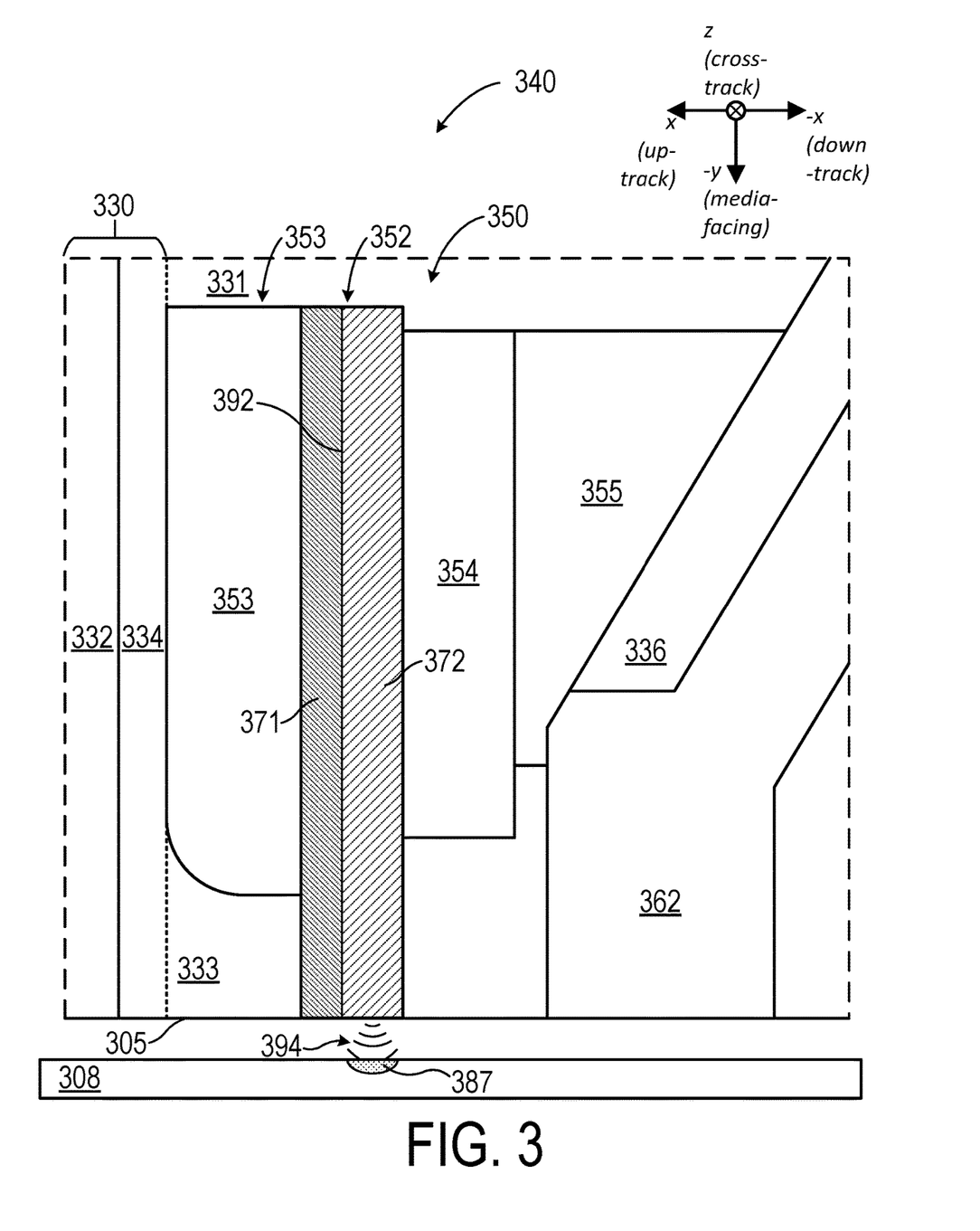
FIG. 3 is a cross-sectional view of an example HAMR head, in accordance with aspects of this disclosure.

FIG. 3 is a cross-sectional view of an example HAMR head, in accordance with aspects of this disclosure. HAMR head 340 is an example of HAMR head 240 of FIG. 2. HAMR head 340 includes a waveguide 330, an NFT 350, a heat sink 355, a diffuser 336, and a write pole 362.

Waveguide 330 is disposed in an up-track direction relative to plasmonic disk 353, near-field emitter 352, and middle disk 354. Waveguide 330 directs photons from a light source (e.g., laser 226 of FIG. 2) toward NFT 350. In some examples, waveguide 330 includes multiple optical layers. Waveguide 330, for example, may include a waveguide core 332 and a core-to-NFT spacing (CNS) layer 334. CNS layer 334 may be part of a cladding structure that also includes a rear cladding layer 331 and/or a front cladding layer 333. In some examples, waveguide core 332 includes a dielectric material (e.g., niobium oxide, tantalum oxide) and CNS layer 334 includes another, different dielectric material (e.g., aluminum oxide, silicon dioxide). In one example, the refractive index of waveguide core 332 is different than the refractive index of CNS layer 334.

Write pole 362 is disposed in a down-track direction relative to waveguide 330 and NFT 350. Write pole 362 is configured to generate a magnetic field in response to a current passed through a writer coil of HAMR head 340. Near-field 394 and a magnetic field from write pole 362 are directed to be partially coincident on hot spot 387 on magnetic disk 308 such that the temperature increase resulting from near-field 394 reduces the magnetic coercivity of the grains within hot spot 387 and enables the magnetic field from write pole 362 to orient them more easily, thus producing more stable bits of written data upon cooling.

Heat sink 355 is disposed in a down-track direction relative to NFT 350 and is coupled to NFT 350. Heat sink 355 is configured to draw heat away from NFT 350. In some examples, drawing heat away from regions of NFT 350 that are prone to thermal degradation may reduce defect formation in NFT 350 and/or extend the operating lifetime of HAMR head 340.

Heat sink 355 may include one or more thermally conductive metals, thermally robust metals, and/or noble metals. Examples of thermally conductive metals include a metal having a thermal conductivity of at least 100 W/mK, such as gold or copper. Examples of thermally robust metals include a metal having a high melting temperature, such as a melting temperature of at least 1500° C. In some examples, a thermally robust metal has a melting temperature of at least 1800° C. In some examples, a thermally robust metal has a melting temperature of at least 2200° C. Examples of thermally robust metals include rhodium, tungsten, tantalum, iridium, platinum, ruthenium, or iron. In some examples, heat sink 355 includes a noble metal that is also a thermally robust metal (e.g., platinum group metals including platinum, iridium, rhodium, ruthenium, osmium, or palladium).

A thermally conductive metal, a thermally robust metal, and/or a noble metal may be a primary metal of heat sink 355. As used herein, a "primary metal" of a feature is a metal that constitutes a higher atomic percentage of the feature than any other metal that is also present in the feature. In some examples, a primary metal of a feature constitutes a majority of the feature. For example, a primary metal of heat sink 355 may constitute greater than 50 atomic percent of heat sink 355.

Diffuser 336 is disposed in a down-track direction relative to heat sink 355. Diffuser 336 is configured to draw heat away from heat sink 355 and dissipate the heat toward other areas of the associated slider (e.g., toward other heat sinks of slider 222 of FIG. 2). In some examples, diffuser 336 includes a thermally conductive metal, a thermally robust metal, and/or a noble metal. In some examples, diffuser 336 includes a noble metal that is also a thermally robust metal. A thermally conductive, a thermally robust metal, and/or a noble metal may be a primary metal of diffuser 336.

NFT 350 is disposed in a down-track direction relative to waveguide 330 and is coupled to waveguide 330. NFT 350 is configured to amplify and emit a near-field 394 to produce a hot spot 387 on a magnetic disk 308. Near-field 394 may be a near-field of LSPs that are generated on NFT 350 through resonance coupling. Write pole 362 is disposed in a down-track relative to waveguide 330 and NFT 350. Write pole 362 is configured to generate a magnetic field in response to a current passed through a writer coil of HAMR head 340. Near-field 394 and a magnetic field from write pole 362 are directed to be partially coincident on magnetic disk 308 such that the temperature increase resulting from near-field 394 (e.g., on hot spot 387) reduces the magnetic coercivity of the grains within hot spot 387 and enables the magnetic field from write pole 362 to orient the magnetic moment of the grains more easily, thus producing more stable bits of written data upon cooling.

In the example of HAMR head 340 of FIG. 3, NFT 350 includes a plasmonic disk 353, a middle disk 354, and a multilayer near-field emitter 352. Plasmonic disk 353 is disposed in a down-track direction relative to and coupled to waveguide 330. Plasmonic disk 353 is configured to generate and support LSPs through resonance coupling of electrons with incident photons which are generated by a light source (e.g., laser 226 of FIG. 2) and are directed toward NFT 350 by waveguide 330. Plasmonic disk 353 includes a plasmonic metal. As used herein, a plasmonic metal is a metal that possesses properties (e.g., electrical properties, optical properties) that promote resonance coupling between photons incident upon the plasmonic metal and free electrons of the plasmonic metal. When the plasmonic metal is confined to a specific size and/or shape (e.g., the dimensions and shape of plasmonic disk 353), such resonant coupling of photons with free electrons of the plasmonic metal may excite one or more localized surface plasmon (LSP) modes. Plasmonic metals that demonstrate efficient plasmon generation in response to photons of a wavelength target or range are said to have a high plasmonic figure of merit. Examples of plasmonic metals include gold, silver, ruthenium, copper, aluminum, and/or rhodium. In some instances, plasmonic disk 353 includes at least one plasmonic metal. NFT 350 may include an alloy that includes a plasmonic metal. In some examples, NFT 350 includes another noble metal including palladium, osmium, iridium, or platinum.

Middle disk 354 is disposed in a down-track direction relative to near-field emitter 352. Middle disk 354 is coupled to near-field emitter 352. In some examples. middle disk 354 is configured to direct localized surface plasmons toward peg 352A of near-field emitter 352. In some examples, middle disk 354 is configured to mitigate background fields. Middle disk 354 may include a noble metal, a thermally robust metal, and/or a thermally conductive metal. In some examples, middle disk 354 includes at least one of gold, iridium, rhodium, copper, tantalum, tungsten, or ruthenium.

Multilayer near-field emitter 352 is configured to emit near-field 394 to produce hot spot 387 on magnetic disk 308. Multilayer near-field emitter 352 is disposed in a down-track direction relative to and coupled to plasmonic disk 353.

In accordance with aspects of this disclosure, multilayer near-field emitter 352 includes a layer 371 and a layer 372 coupled to layer 371. A down-track surface of layer 371 is coupled to an up-track surface of layer 372 at an interface 392 that terminates proximal to a media-facing surface 305 of HAMR head 340. Interface 392 may be substantially orthogonal to media-facing surface 305. Interface 392 divides multilayer near-field emitter 352 into an up-track region that includes layer 371 and a down-track region that includes layer 372. In some examples, a portion of layer 371 is exposed on media-facing surface 305. In other examples, layer 371 is recessed from media-facing surface 305. For example, there may be a gap or a layer of material, such as an oxide, between layer 371 and media-facing surface 305. An up-track surface of layer 371 is coupled to a down-track surface of plasmonic disk 353. A down-track surface of layer 372 is coupled to an up-track surface of middle disk 354.

Layer 371 and layer 372 include different materials. For example, layer 371 may include a group 13 metal (e.g., aluminum, indium), a transition metal (e.g., rhodium), an alkaline earth metal (e.g., magnesium), or a group 14 metal (e.g., tin), and layer 372 may include a thermally robust metal (e.g., iridium) or a plasmonic metal (e.g., gold).

Layer 371 and layer 372 may have different optical extinction coefficients. In some examples, the optical extinction coefficient of layer 371 is greater than the optical extinction coefficient of layer 372. The optical extinction coefficient of layer 371 may be at least 6.5. In some examples, the optical extinction coefficient of layer 371 is at least 7, and, in one example, the optical extinction coefficient of layer 371 is at least 8. Layer 371 may have a high plasma frequency, for example a plasma frequency of at least 7 eV. In one example, layer 371 has a plasma frequency of at least 12 eV.

Optical extinction coefficients of layers 371 and 372 may be specific to an optical wavelength or frequency. That is, the optical extinction coefficient of layer 372 at a wavelength may be less than the optical extinction coefficient of layer 371 at the wavelength. In some examples, the wavelength (e.g., the wavelength of light emitted from laser 226 of FIG. 2) is from 800 nanometers to 900 nanometers. In one example, the wavelength is about 830 nm.

A layer 371 that has a higher optical extinction coefficient than layer 372 and/or has a high plasma frequency may repel electric fields from layer 371. For example, a layer 371 having a higher optical extinction coefficient than layer 372 and/or a plasma frequency of at least 8 eV may repel a near-field of layer 372, which may reduce penetration of the near-field of layer 372 into layer 371. Repelling a near-field of layer 372 may reduce a portion of the near-field that reaches other features that are opposite layer 371 from layer 372 (e.g., plasmonic disk 353) and may reduce heating and thermal exposure of these features. Repelling a near-field of layer 372 may also reduce non-emissive dissipation of the near-field, that is, energy that is not emitted as emitted near-field 394 toward magnetic disk 308, and may reduce the laser power required for HAMR head 340 to write data. Reducing the laser power may further reduce heating and thermal exposure of HAMR head 340 and may extend the operating life of HAMR head 340. Additionally, repelling a near-field of layer 372 may provide better confinement of the near-field on layer 372, potentially increasing the thermal gradient of emitted near-field 394 and producing smaller bits of data on magnetic disk 308. That is, a multilayer near-field emitter 352 having a first layer 371 with a higher optical extinction coefficient than a second layer 372 and/or having a high plasma frequency may provide HAMR head 340 with thermal and/or areal density capability (ADC) benefits.

Figure 4:
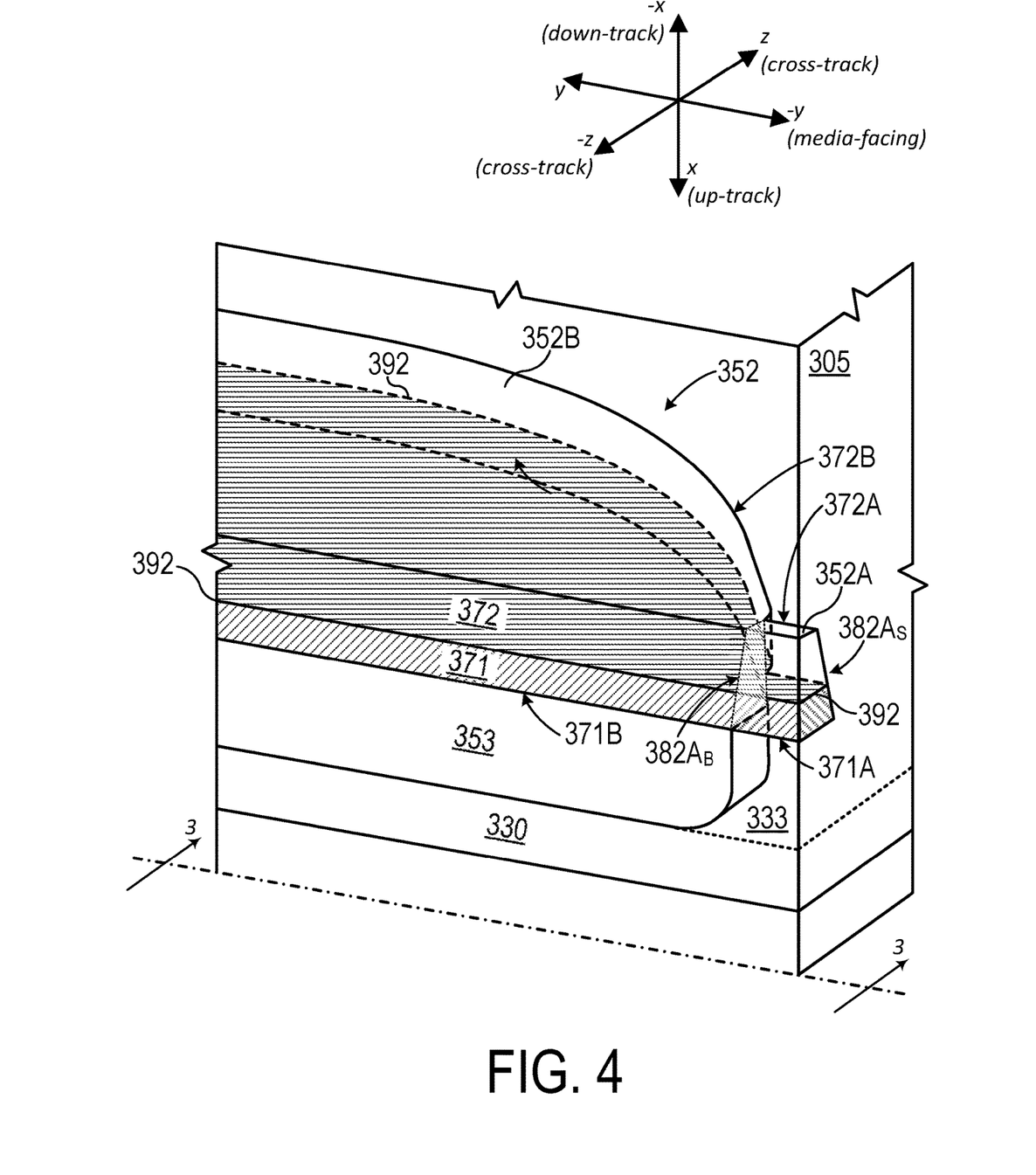
FIG. 4 is a perspective view of an example HAMR head, in accordance with aspects of this disclosure.

FIG. 4 is a perspective view of an example HAMR head, in accordance with aspects of this disclosure. FIG. 4 is a cross-sectional perspective view of HAMR head 340 of FIG. 3, with the view of the section of HAMR head 340 illustrated in FIG. 3 indicated by the line 3-3 of FIG. 4 facing in the direction of the arrows.

Near-field emitter 352 includes a peg 352A and an anchor disk 352B. Peg 352A is configured to receive and amplify a near-field of the distribution of LSPs and emit near-field to produce a hot spot on a magnetic disk (e.g., hot spot 387 on magnetic disk 308 of FIG. 3). Peg 352A is disposed proximal to a media-facing surface 305 of HAMR head 340. Peg includes a front surface 382A$_S$ proximal to media-facing surface 305 and a rear boundary 382A$_B$ opposite peg 352A from front surface 382A$_S$. In some instances, one or more portions of peg 325A are exposed on media-facing surface 305.

Anchor disk 352B is disposed behind peg 352A relative to media-facing surface 305 (e.g., in the +y dimension, opposite the −y media-facing dimension). Anchor disk 352B is coupled to rear boundary 382A$_B$ of peg 352A and to plasmonic disk 353. Anchor disk 352B is configured to support a distribution of LSPs. In some examples, anchor disk 352B is configured to participate in LSP generation. For example, peg 352A may generate a hot spot on a magnetic disk by receiving and condensing a distribution of LSPs from anchor disk 352B and/or other features, amplifying a near-field of the LSP distribution, and emitting an amplified near-field (e.g., near-field 394 of FIG. 3) toward the surface of the magnetic disk.

Interface 392 divides peg 352A into an up-track region including a portion 371A of layer 371, and down-track region including a portion 372A of layer 372. Interface 392 further divides anchor disk 352B into an up-track region and a down-track region. The up-track region of anchor disk 352B includes another, different portion 371B of layer 371. The down-track region of anchor disk 352B includes another, different portion 372B of layer 372. In some examples, portion 371A of layer 371 is recessed from media-facing surface 305 and/or front surface 382A$_S$ of peg 352A. That is, there may be a gap or a layer of material (e.g., an oxide) between portion 371A and media-facing surface 305.

Figure 5:
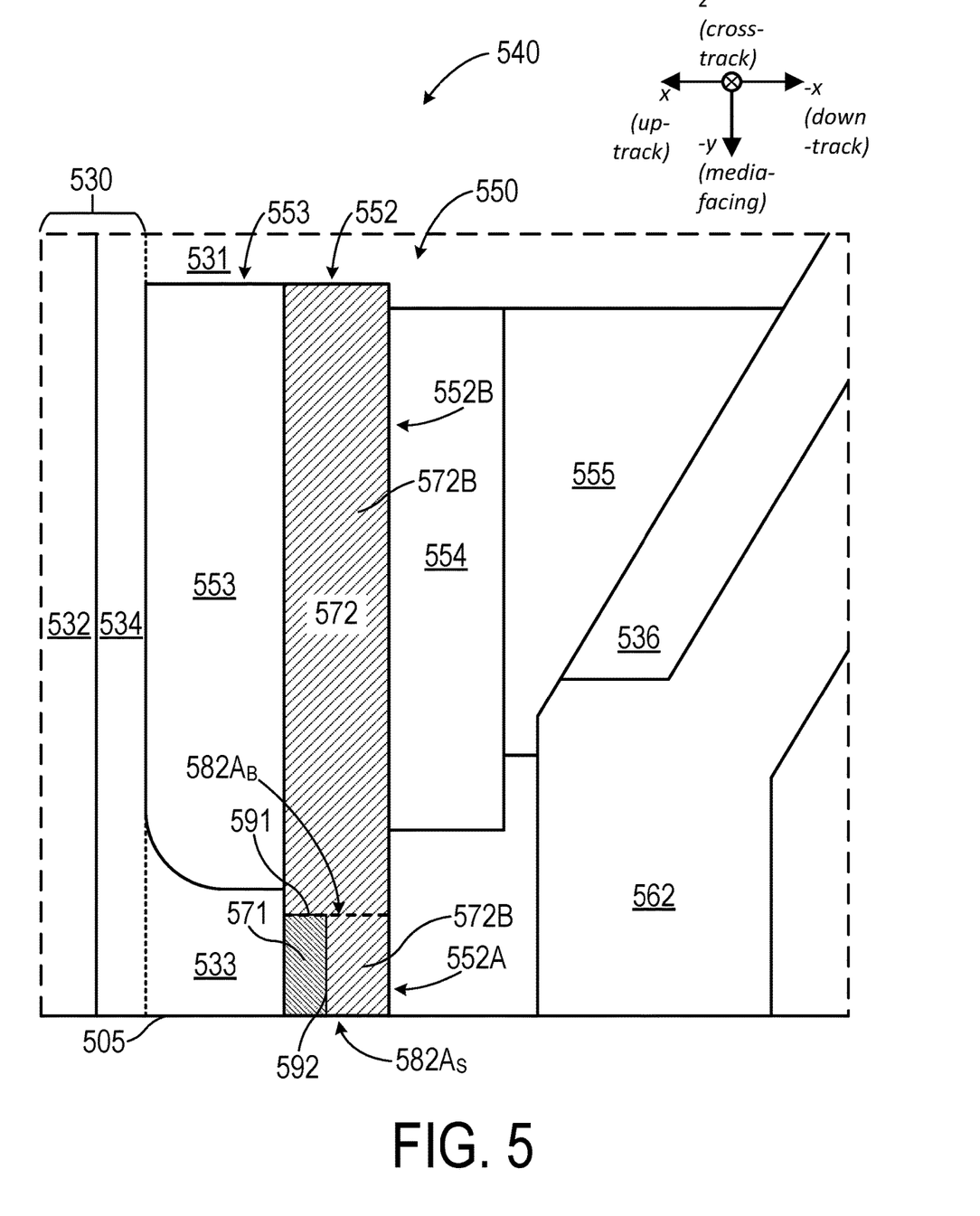
FIG. 5 is a cross-sectional view of an example HAMR head, in accordance with aspects of this disclosure.

FIG. 5 is a cross-sectional view of an example HAMR head, in accordance with aspects of this disclosure. HAMR head 540 is an example of HAMR head 240 of FIG. 2. HAMR head 540 includes a waveguide 530, an NFT 550, a heat sink 555, a diffuser 536, and a write pole 562. Waveguide 530 may include a waveguide core 532 and a core-to-NFT spacing (CNS) layer 534. CNS layer 534 may be part of a cladding structure that also includes a rear cladding layer 531 and/or a front cladding layer 533. In the example of HAMR head 540 of FIG. 5, NFT 550 includes a plasmonic disk 553, a middle disk 554, and a multilayer near-field emitter 552.

Multilayer near-field emitter includes a peg 552A disposed proximal to a media-facing surface 505 of HAMR head 540. Peg 552A includes a front surface 582A$_S$ proximal to media-facing surface 505, and a rear boundary 582A$_B$ opposite peg 552A from front surface 582A$_S$. An anchor disk 552B is disposed behind peg 552A relative to media-facing surface 305 and coupled to rear boundary 582A$_B$ of peg 552A.

An interface 592 divides peg 552A into an up-track region and a down-track region. The up-track region of peg 552A includes a first layer 571 of multilayer near-field emitter 552. The down-track region of peg 552A includes a portion 572A of a second layer 572 of multilayer near-field emitter 552. Anchor disk 552B includes another, different portion 572B of second layer 572. Layer 571 includes a rear surface that is proximal to rear boundary 582A$_B$ of peg 552A. The rear surface of layer 571 is coupled, at an interface 591, to a front surface of the portion of layer 572 that is included in anchor disk 552B. Interface 591 terminates at interface 592. Interface 591 may be substantially orthogonal to interface 592. Interface 592 further terminates at interface 591. In some examples, layer 571 is recessed from media-facing surface 505 and/or front surface 582A$_S$ of peg 552A. That is, there may be a gap or a layer of material (e.g., an oxide) between portion 571 and media-facing surface 505.

Layer 571 and layer 572 include different materials. For example, layer 571 may include a group 13 metal, a transition metal, an alkaline earth metal, or a group 14 metal, and layer 572 may include a thermally robust metal or a plasmonic metal. Layer 571 and layer 572 may have different optical extinction coefficients. In some examples, the optical extinction coefficient of layer 571 is greater than the optical extinction coefficient of layer 572. The optical extinction coefficient of layer 571 may be at least 6.5. In some examples, the optical extinction coefficient of layer 571 is at least 7, and, in one example, the optical extinction coefficient of layer 571 is at least 8. Layer 571 may have a high plasma frequency, for example a plasma frequency of at least 8 eV. In one example, layer 571 has a plasma frequency of at least 13 eV.

Figure 6:
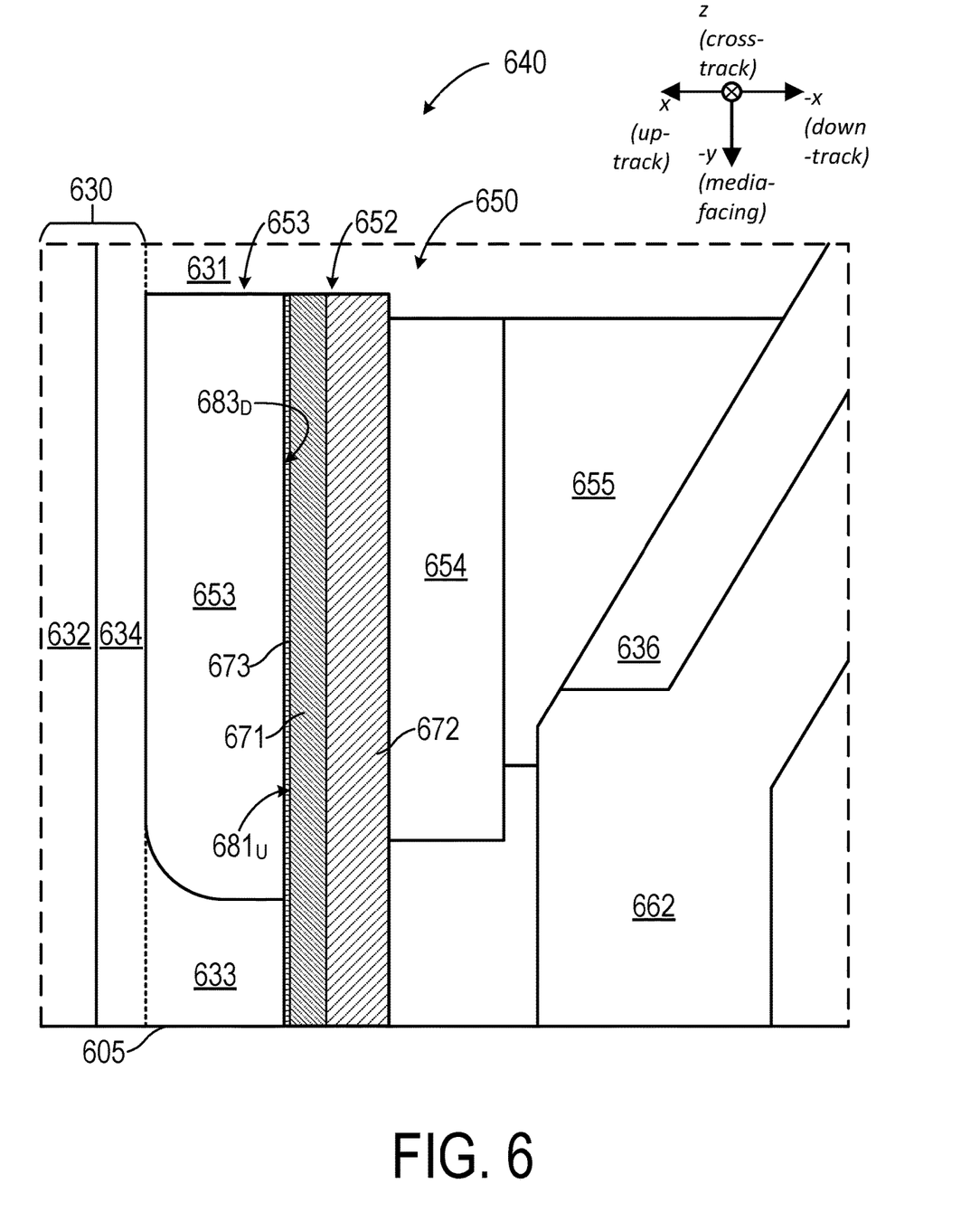
FIG. 6 is a cross-sectional view of an example HAMR head, in accordance with aspects of this disclosure.

FIG. 6 is a cross-sectional view of an example HAMR head, in accordance with aspects of this disclosure. HAMR head 640 is an example of HAMR head 240 of FIG. 2. HAMR head 640 includes a waveguide 630, an NFT 650, a heat sink 655, a diffuser 636, and a write pole 662. Waveguide 630 may include a waveguide core 632 and a core-to-NFT spacing (CNS) layer 634. CNS layer 634 may be part of a cladding structure that also includes a rear cladding layer 631 and/or a front cladding layer 633. In the example of HAMR head 640 of FIG. 6, NFT 650 includes a plasmonic disk 653, a middle disk 654, and a multilayer near-field emitter 652.

Multilayer near-field emitter 652 includes a layer 671, a layer 672 coupled to layer 671, and a layer 673 disposed along an up-track surface 681$_U$ of layer 671. In some examples, layer 673 is coupled to a down-track surface 683$_D$ of plasmonic disk 653.

Layer 671 and layer 672 include different materials. For example, layer 671 may include a group 13 metal, a transition metal, an alkaline earth metal, or a group 14 metal, and layer 672 may include a thermally robust metal or a plasmonic metal. Layer 671 and layer 672 may have different optical extinction coefficients. In some examples, the optical extinction coefficient of layer 671 is greater than the optical extinction coefficient of layer 672. The optical extinction coefficient of layer 671 may be at least 6.5. In some examples, the optical extinction coefficient of layer 671 is at least 7, and, in one example, the optical extinction coefficient of layer 671 is at least 8. Layer 671 may have a high plasma frequency, for example a plasma frequency of at least 8 eV. In one example, layer 671 has a plasma frequency of at least 13 eV.

Layer 673 may be configured to prevent diffusion of layer 671 or plasmonic disk 653, or to promote adhesion between layer 671 and plasmonic disk 653. Layer 673 may include a thermally robust metal. In some examples, layer 673 includes a noble metal such as a platinum group metal (e.g., iridium).

Various examples have been presented for the purposes of illustration and description. These and other examples are within the scope of the following claims.

What is claimed is:

1. A heat-assisted magnetic recording head comprising a near-field transducer comprising:
   a plasmonic disk; and
   a multilayer near-field emitter configured to produce a hot spot on a magnetic disk that is proximal to the near-field transducer;
   wherein the multilayer near-field emitter is disposed in a down-track direction relative to and coupled to the plasmonic disk, and
   wherein the multilayer near-field emitter comprises:
      a first layer having a first optical extinction coefficient; and
      a second layer coupled to the first layer and having a second optical extinction coefficient that is different than the first optical extinction coefficient.

2. The heat-assisted magnetic recording head of claim 1, wherein the first optical extinction coefficient is greater than the second optical extinction coefficient.

3. The heat-assisted magnetic recording head of claim 1, wherein the first optical extinction coefficient is at least 6.5.

4. The heat-assisted magnetic recording head of claim 1, wherein the first layer has a plasma frequency of at least 10 electron-volts.

5. The heat-assisted magnetic recording head of claim 1,
   wherein the first layer comprises a first material, and
   wherein the second layer comprises a second material that is different than the first material.

6. The heat-assisted magnetic recording head of claim 5, wherein the first material comprises a group 13 metal, a transition metal, an alkaline earth metal, or a group 14 metal.

7. The heat-assisted magnetic recording head of claim 6, wherein the first material comprises aluminum, indium, rhodium, magnesium, or tin.

8. The heat-assisted magnetic recording head of claim 5, wherein the second material comprises a thermally robust metal or a plasmonic metal.

9. The heat-assisted magnetic recording head of claim 8, wherein the second material comprises iridium or gold.

10. The heat-assisted magnetic recording head of claim 1, wherein a down-track surface of the first layer is coupled to an up-track surface of the second layer at an interface.

11. The heat-assisted magnetic recording head of claim 10, wherein the interface divides the multilayer near-field emitter into:
   an up-track region comprising the first layer; and
   a down-track region comprising the second layer.

12. The heat-assisted magnetic recording head of claim 10, the multilayer near-field emitter further comprising:
   a peg disposed proximal to a media-facing surface of the heat-assisted magnetic recording head and comprising:
      a front surface proximal to the media-facing surface; and
      a rear boundary opposite the peg from the front surface; and
   an anchor disk disposed behind the peg relative to the media-facing surface and coupled to the rear boundary of the peg,
   wherein the interface divides the peg into:
      an up-track region comprising at least a portion of the first layer; and
      a down-track region comprising a portion of the second layer.

13. The heat-assisted magnetic recording head of claim 12,
   wherein the interface further divides the anchor disk into an up-track region and a down-track region,
   wherein the portion of the first layer is a first portion of the first layer,
   wherein the portion of the second layer is a first portion of the second layer,
   wherein the up-track region of the anchor disk comprises a second portion of the first layer, and
   wherein the down-track region of the anchor disk comprises a second portion of the second layer.

14. The heat-assisted magnetic recording head of claim 12,
   wherein the portion of the second layer is a first portion of the second layer,
   wherein the anchor disk comprises a second portion of the second layer,
   wherein the interface is a first interface,
   wherein first layer comprises a rear surface that proximal to the rear boundary of the peg, and
   wherein the rear surface of the first layer is coupled to a front surface of the second portion of the second layer at a second interface,
      the second interface terminating at the first interface, and
      the first interface further terminating at the second interface.

15. The heat-assisted magnetic recording head of claim 1, wherein an up-track surface of the first layer is coupled to a down-track surface of the plasmonic disk.

16. The heat-assisted magnetic recording head of claim 1, the near-field transducer further comprising a middle disk disposed in a down-track direction relative to the near-field emitter, wherein a down-track surface of the second layer is coupled to an up-track surface of the middle disk.

17. The heat-assisted magnetic recording head of claim 1, further comprising a third layer disposed along an up-track surface of the first layer.

18. The heat-assisted magnetic recording head of claim 17, wherein the third layer comprises a noble platinum group metal.

19. The heat-assisted magnetic recording head of claim 17, wherein the third layer is coupled to a down-track surface of the plasmonic disk.

* * * * *